Figure 1:
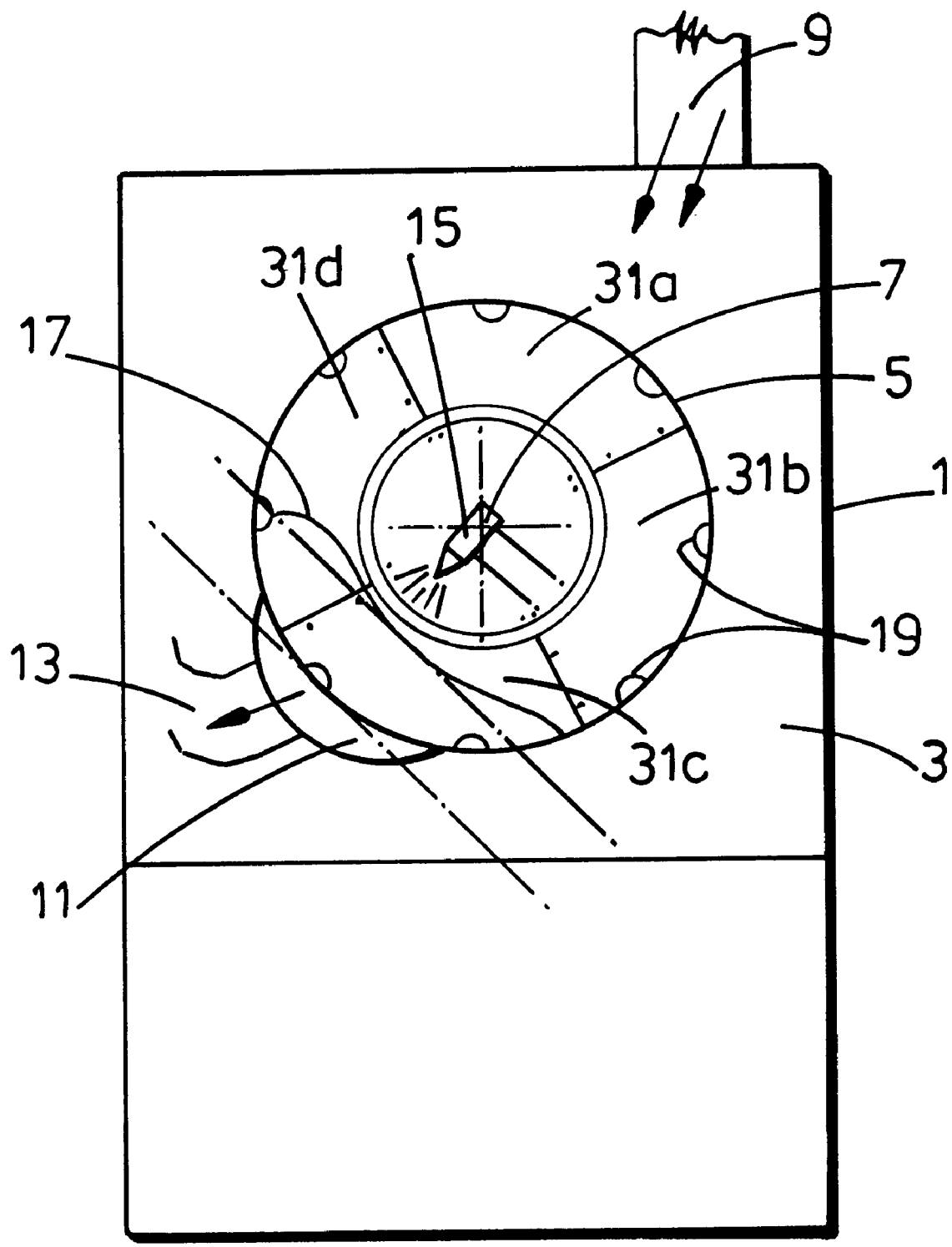

United States Patent [19]
Morrow et al.

[11] Patent Number: 6,129,038
[45] Date of Patent: Oct. 10, 2000

[54] TABLET COATING MACHINE

[75] Inventors: Kenneth Lawrence Morrow, Whiston; Paul Raymond Westcott, Liverpool, both of United Kingdom

[73] Assignee: BWI plc, United Kingdom

[21] Appl. No.: 09/063,600

[22] Filed: Apr. 21, 1998

[51] Int. Cl.[7] .................................................. A23G 3/00
[52] U.S. Cl. ............................... 118/19; 118/13; 118/24; 118/320; 118/418
[58] Field of Search ................................. 118/13, 19, 24, 118/320, 418; 366/220; 427/2.14

[56] References Cited

U.S. PATENT DOCUMENTS

| | | | |
|---|---|---|---|
| 3,601,086 | 8/1971 | Hostetler | 118/19 |
| 4,676,187 | 6/1987 | Grabowski | 118/19 |
| 5,302,201 | 4/1994 | Lucke | 118/24 |
| 5,397,393 | 3/1995 | Tsujino et al. | 118/19 |
| 5,531,826 | 7/1996 | Fusejima et al. | 118/19 |
| 5,538,195 | 7/1996 | Nakazawa et al. | 118/19 |

*Primary Examiner*—Laura Edwards
*Attorney, Agent, or Firm*—Foley & Lardner

[57] ABSTRACT

A tablet coating machine for applying a coating to a bed of tablets, the machine comprising a circular drum with frusto-conical ends which is rotated about its axis. The periphery of the drum is perforated to allow air to flow through the bed of tablets disposed in the drum under the action of a suction shoe. In order to be able to optimise the efficiency of the tablet coating process for different quantities of tablets, the volumetric capacity of the drum is adjustable to achieve a desired tablet depth for the quantity of tablets being processed. More particularly an axially adjustable wall portion is provided within the drum to adjust the length of the tablet containing portion of the drum. The wall portion is made up of segments which are dimensioned to fit through an opening into the drum by which tablets are introduced into the drum. In one embodiment a threaded rod is connected between the wall portion and an end wall of the drum to facilitate adjustment of the wall portion within the drum the area over which air is sucked from the drum by the suction shoe applied to the periphery therof, is adjustable to tailor it to the length of the table containing portion of the drum.

13 Claims, 2 Drawing Sheets

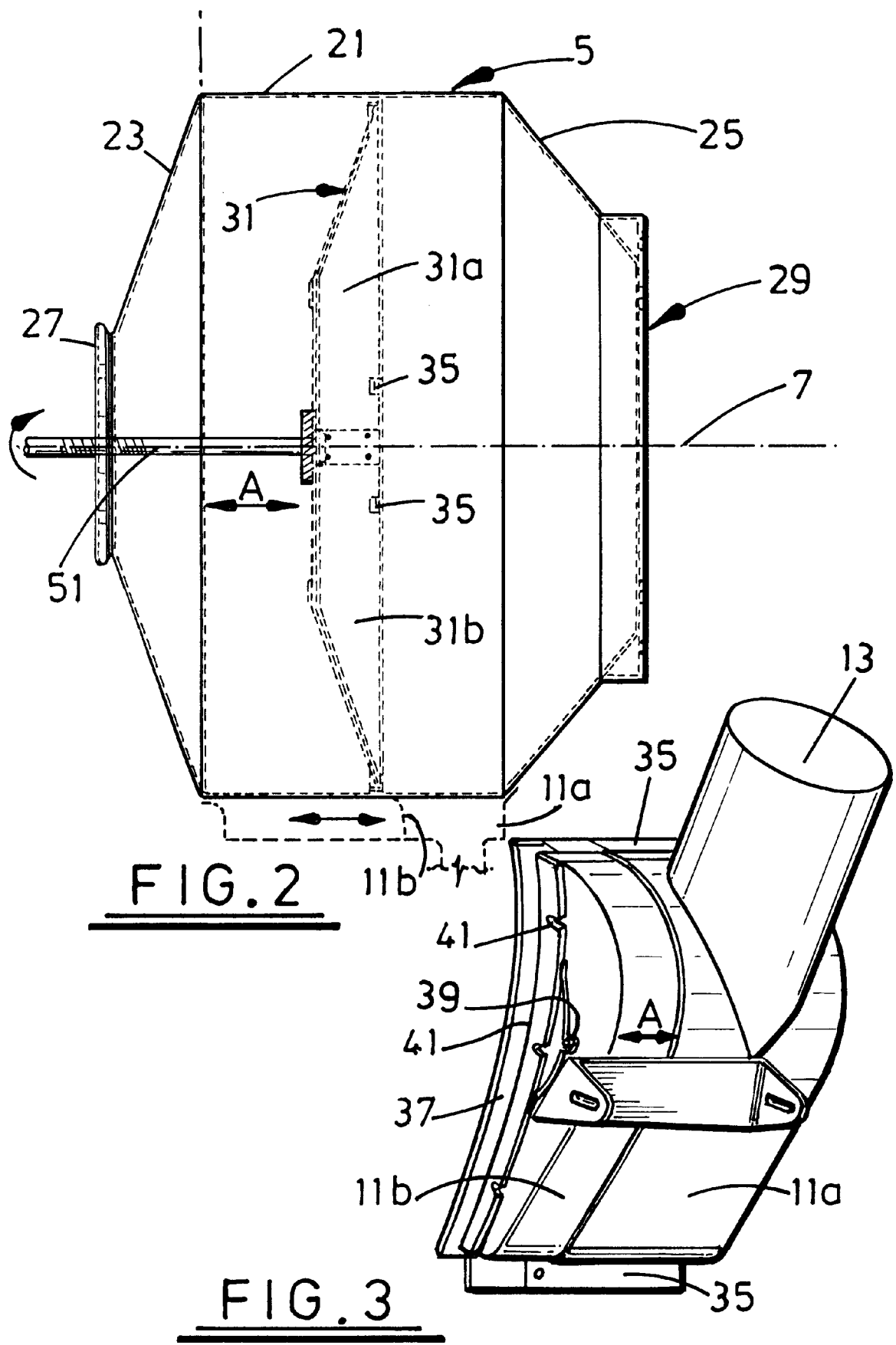

TABLET COATING MACHINE

The present invention relates to tablet coating and in particular to tablet coating machines.

A well known tablet coating machine comprises a circular drum with frustro-conical sides which is rotated about its axis by suitable means e.g. chain drive. The drum is located in a housing and the periphery of the drum is perforated to allow air to flow through a bed of tablets disposed in the drum. The tablets are loaded into the drum through an opening in one side of the drum disposed in a plane perpendicular to the axis of the rotation of the drum. A spray gun is mounted from a non rotatable part of the machine and has a nozzle positioned to direct the desired coating material towards tablets disposed in the drum. An open face of a suction shoe is disposed on the outside of the drum adjacent the periphery of the drum. Rotation of the drum in conjunction with the action of the air flow and any optional mixing means disposed in the drum generates a circulation of the bed of tablets so that an even coating is built up on all the tablets in the drum over a prescribed period of time.

The aim of such a device is to achieve a desired coating depth on a given quantity of tablets (measured in terms of weight gain) as efficiently as possible, where efficiency is measured in terms of the coating time and the efficient utilization of coating material i.e. minimum wastage. Existing machines are designed for optimum performance with a specific quantity of tablets (conveniently expressed in terms of weight). To this end a range of machines are offered and the machines operate most efficiently when running at full capacity. An operator requiring to do a small batch will suffer a reduction in coating efficiency with the existing machines and the present invention aims to provide a solution.

Accordingly, the present invention provides a tablet coating machine comprising a housing in which a tablet receiving drum is mounted for rotation about an axis, and wherein the volumetric capacity of the drum is adjustable to achieve a desired tablet bed depth for the quantity of tablets being processed, and means for extracting air out from the drum through perforations therein.

The quantity of tablets retained in the drum is dependent on its diameter and its length. By adjusting the volumemetric capacity of the drum the tablet bed depth can be adjusted so that the coating performance can be optimised for any quantity of tablets being processed up to the maximum capacity of the drum. The volumemetric capacity is conveniently adjusted by making the length of the tablet containing portion of the drum adjustable. The tablet containing portion of the drum is defined at least in part by a cylindrical peripheral portion and opposite end portions. The drum could be made in two parts which are adjustably postionable with respect to one another more preferably adapting the machine to operate with quantities less than the maximum optimum capacity for the drum is conveniently achieved by providing the inside of the drum with an adjustable wall portion which is adjustable in the direction of the axis of rotation. Conveniently the wall portion is made up of a plurality of segments which can be introduced through the opening into the drum.

Since the provision of the adjustable wall portion reduces the length of the perforated peripheral portion of the drum it is advantageous if the means for extracting air from the drum through the perforations is adjustable to tailor it to the length of the peripheral portion of the drum. Alternatively a plurality of differently sized suction shoes may be provided.

The present invention will now be described further hereinafter, by way of example only, with reference to the accompanying drawings, in which:

FIG. 1 is a diagrammatic front view of a tablet coating apparatus embodying the present invention, FIG. 2 is a side view of a drum of a tablet coating apparatus embodying the present invention, and FIG. 3 is a perspective view of a suction shoe for use with the tablet coating apparatus of the present invention.

Referring firstly to FIG. 1, tablet coating apparatus according to the invention comprises a housing (1) having an upper chamber (3) which accommodates a coating pan (5) comprising a drum mounted for rotation about a horizontal axis (7). The housing is provided with a air inlet (9), a suction shoe (11) connected to an exhaust line (13), and a spray gun (15) disposed within the drum (5) carried by a framework mounted to the housing. A bed of tablets is portrayed by the dotted outline (17). Mixing bars are illustrated at (19). The drum is described further with reference to FIG. 2. It has a cylindrical portion (21) and frustro-conical end portions (23 & 25). Fixing flange (27) is provided to one side of the drum for securing to means for rotating the drum about axis (7) and the other side of the drum has an opening (29) which aligns with an opening door in the housing to permit loading of tablets into the drum.

In the illustrated embodiment adjustment of the volumetric capacity of the drum made possible by the provision of an adjustable wall portion (31). In the illustrated embodiment this made up of four truncated sectors (31a,b,d & d) which are secured together where their edges abut and are secured to the drum by convenient fixing means such as nuts and bolts (35) disposed at the spaced positions around the periphery of the drum. Where the maximum capacity of the drum is required then the intermediate wall portion (31) can be removed.

Adjustment of the axial position of the wall portion may be adjusted in a continuously variable manner by means of a threaded adjusting rod 51 which engages threading with an end plate whereby rotation of the rod causes the wall portion 31 to move axially. The rod may be rotable with respect to the wall portion whilst being held axially captive to the wall portion. On the other hand the rod may be fixed to the wall portion, whereby rotation of the wall portion with respect to the drum gives rise to axial adjustment. The fixings 35 are preferable but potentially optional when the aforementioned adjusting rod is provided, provided some anti-rotation means is provided to locate the wall portion in the desired axial position.

FIG. 3 illustrates one embodiment of suction shoe having a fixed portion (11a) provided with an air outlet connection (13) and a relatively removable portion (11b). The open edge portion (41) of the shoe is configured to closely conform to the periphery of the drum (5). Adjustment direction is denoted by arrow A. FIG. 2 illustrates diagrammatically the provision of the suction shoe (11) to the periphery of the drum (5) and the need to provide an adjustable wall portion (11b) so that air is sucked from that periphery of the drum which contains the tablets thereby avoiding loss of air and coating material through other portions of the drum periphery i.e. that to the left of the intermediate wall portion (31) as viewed in FIG. 2. Seal elements (35, 37) are provided around the periphery of the open end of the shoe and are conveniently of low friction material for running engagement with the drum. Preferably at least the side seal elements (37) are spring (39) loaded into contact with the drum. Slot (41) enables the seal (37) to float.

In order to optimise the coating operation in relation to the quantity of material contained in the drum it is advantageous for the spray nozzle (15) to be adjustably positionable in a direction parallel to the axis (7) so that the spray nozzle is aimed at the centre of the tablet bed. This can be conveniently achieved by providing a guide rail along which the spray nozzle is slidably adjustable secureably locatable. It is to be understood that the suction shoe shown in FIG. 3 is merely one possible embodiment. The essential feature being that means is provided for tailoring the opening to size of the drum periphery which accommodates tablet material.

What is claimed is:

1. A tablet coating machine comprising a housing, a tablet receiving drum mounted in the housing for rotation about an axis, the drum having perforations therein and means for extracting air out of the drum through the perforation, and wherein volumetric capacity of the drum is adjustable to achieve a desired table bed depth for the quantity of tablets being processed and wherein the means for extracting air from the drum through the perforations therein comprises a suction shoe whose length is adjustable to tailor the air extraction area to the length of the peripheral portion of the drum containing tablets, and means for applying a desired coating to the tablets.

2. A tablet coating machine according to claim 1 wherein a tablet containing portion of the drum is defined at least in part by a cylindrical peripheral portion of the drum and opposite end portions.

3. A tablet coating machine according to claim 2 wherein the volumetric capacity of the drum is adjusted by making the tablet containing portion of the drum adjustable.

4. A tablet coating machine according to claim 1 wherein one opposite end portion comprises an adjustable wall portion which is disposed within the drum and is adjustable in a direction parallel to the axis of rotation of the drum.

5. A tablet coating machine according to claim 4 wherein the adjustable wall portion is constructed from a plurality of segments.

6. A tablet coating machine according to claim 4 in which the drum has an opening for the introduction of tablets into the drum and wherein the segments are introduced into the drum through said opening.

7. A tablet coating machine according to claim 4 and further comprising means for adjusting the axial position of the wall portion within the drum.

8. A tablet coating machine according to claim 4 wherein means is provided to secure the wall portion to the drum in the desired axial position.

9. A tablet coating machine according to claim 1 wherein said coating means comprises a spray nozzle for applying a desired coating to the tablets and wherein the position of the spray nozzle is adjustable in a direction parallel to the axis of the drum so that the spray nozzle is aimed at the centre of the tablet bed.

10. A tablet coating machine comprising a housing, a tablet receiving drum mounted in the housing for rotation about an axis, the drum having perforations therein and means for extracting air out of the drum through the perforations, and wherein volumetric capacity of the drum is adjustable to receive a desired tablet bed depth for the quantity of tablets being processed; means for applying a desired coat into the tablets, wherein one opposite end portion comprises an adjustable wall portion which is disposed within the drum and is adjustable in a direction parallel to the axis of rotation of the drum, and further comprising means for adjusting the axial position of the wall portion within the drum; wherein said means for adjusting the position of the wall portion comprises a threaded shaft in a threaded engagement with an end wall of the drum and rotatable to adjust the position of the wall portion in a continuous variable manner.

11. A tablet coating machine comprising a housing, a tablet receiving drum mounted in the housing for rotation about an axis, the drum having perforations therein and means for extracting air out of the drum through the perforations, and wherein volumetric capacity of the drum is adjustable to achieve a desired tablet bed depth for the quantity of tablets being processed and wherein the means for extracting air from the drum through the perforations therein comprises a suction shoe whose air extraction area is tailored to the length of the peripheral portion of the drum containing tablets, and means for applying a desired coating to the tablets.

12. A tablet coating machine according to claim 11 where the air extraction area is tailored by adjusting the length of the shoe.

13. A tablet coating machine according to claim 11 wherein a plurality of differently sized suction shoes are provided and the air extraction area is tailored to the length of the peripheral portion of the drum containing tablets by selecting an appropriate suction shoe from the plurality of differently sized suction shoes.

* * * * *

UNITED STATES PATENT AND TRADEMARK OFFICE
CERTIFICATE OF CORRECTION

PATENT NO. : 6,129,038  
DATED : October 10, 2000  
INVENTOR(S) : Morrow et al.

Page 1 of 1

It is certified that error appears in the above-identified patent and that said Letters Patent is hereby corrected as shown below:

--Foreign Application Priority Data April 23, 1997 [GB] United Kingdom 9708204.4--

Signed and Sealed this

Twenty-sixth Day of June, 2001

Attest:

Attesting Officer

NICHOLAS P. GODICI  
*Acting Director of the United States Patent and Trademark Office*